(12) United States Patent
Fagadar-Cosma et al.

(10) Patent No.: US 9,402,053 B2
(45) Date of Patent: Jul. 26, 2016

(54) METHOD FOR CONTROL OF A VIDEO INTERFACE, METHOD FOR OPERATION OF A VIDEO INTERFACE, FACE ORIENTATION DETECTOR, AND VIDEO CONFERENCING SERVER

(71) Applicant: Alcatel Lucent, Boulogne Billancourt (FR)

(72) Inventors: Mihai Fagadar-Cosma, Antwerp (BE); Miguel Casas-Sanchez, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 13 days.

(21) Appl. No.: 14/384,883

(22) PCT Filed: Mar. 5, 2013

(86) PCT No.: PCT/EP2013/054331
§ 371 (c)(1),
(2) Date: Sep. 12, 2014

(87) PCT Pub. No.: WO2013/135523
PCT Pub. Date: Sep. 19, 2013

(65) Prior Publication Data
US 2015/0077504 A1      Mar. 19, 2015

(30) Foreign Application Priority Data

Mar. 12, 2012   (EP) .................................... 12290086

(51) Int. Cl.
*H04N 7/15* (2006.01)
*H04N 7/14* (2006.01)
*G06K 9/00* (2006.01)

(52) U.S. Cl.
CPC .............. *H04N 7/15* (2013.01); *G06K 9/00261* (2013.01); *H04N 7/147* (2013.01)

(58) Field of Classification Search
CPC ......... H04N 7/15; H04N 7/147; H04N 7/152; H04N 7/14; H04N 7/142; G06K 9/00261
USPC .............. 348/14.01–14.16; 382/190; 345/659
See application file for complete search history.

(56) References Cited

U.S. PATENT DOCUMENTS

2007/0263077 A1   11/2007  Dhuey et al.
2008/0266385 A1   10/2008  Smith et al.
(Continued)

FOREIGN PATENT DOCUMENTS

CN    101808220 A    8/2010
JP    2003-15816 A   1/2003
(Continued)

OTHER PUBLICATIONS

Anton Nijholt, "Google home: Experience, support and re-experience of social home activities," Information Sciences, vol. 178, No. 3, pp. 612-630, XP022332418, Nov. 6, 2007.
(Continued)

*Primary Examiner* — Melur Ramakrishnaiah
(74) *Attorney, Agent, or Firm* — Fay Sharpe, LLP

(57) ABSTRACT

The present invention relates to a method for control of a video interface (4) associated to a user (12) for use in conference situations and the like, comprising the steps of capturing a frame (11) of a video stream originated from the user (12), recognizing a face (10) of the user (12) within the video frame (11), detecting an orientation of the face (10) of the user (12) within the video frame (11), and providing a control signal indicating the orientation of the face (10). The invention also relates to a method for operation of the video interface (4) comprising the steps of the above control method, mapping the orientation of the face (10) based on the control signal to a focus area (15) of the video interface (4), and highlighting the focus area (15). The invention further relates to a face orientation detector (6) and a video conferencing server (5), which are adapted to perform the above methods.

14 Claims, 5 Drawing Sheets

(56) References Cited

U.S. PATENT DOCUMENTS

Figure 1:
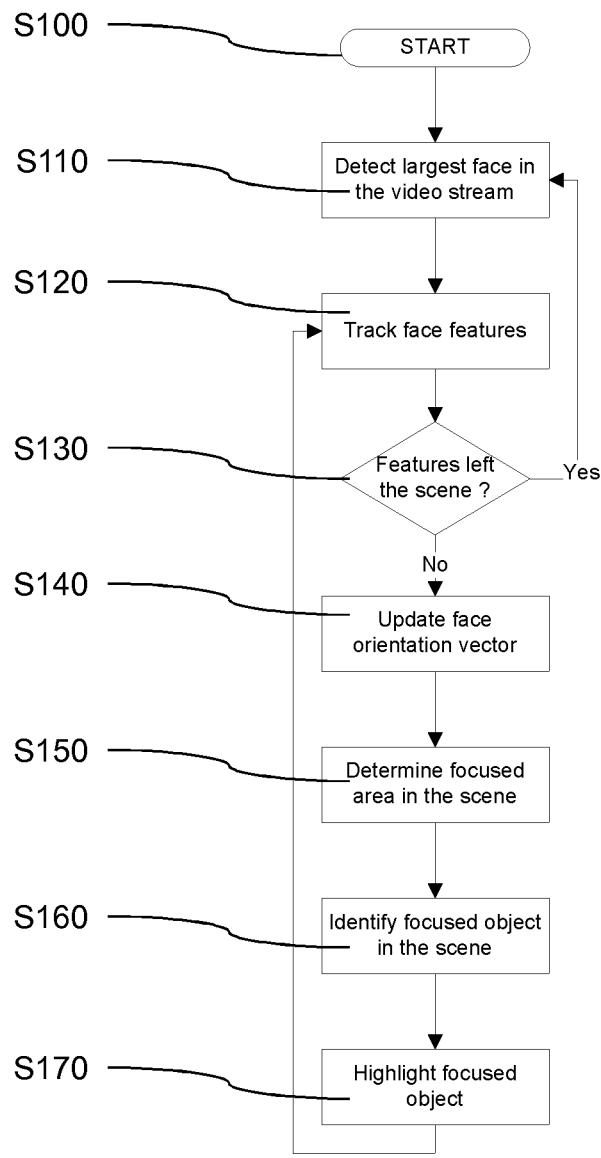

| 2010/0205667 A1* | 8/2010 | Anderson et al. ............... 726/19 |
| 2011/0018963 A1* | 1/2011 | Robinson .................. 348/14.16 |

FOREIGN PATENT DOCUMENTS

| JP | 2005-18654 A | 1/2005 |
| JP | 2005-130251 A | 5/2005 |
| JP | 2006-139028 A | 6/2006 |
| JP | 2008-299737 A | 12/2008 |
| JP | 2009-80573 A | 4/2009 |
| WO | WO 2004/053795 A2 | 6/2004 |

OTHER PUBLICATIONS

Nicolas Gourier et al., "Estimating Face orientation from Robust Detection of Salient Facial Structures," FG Net Workshop on Visual Observation, pp. 1-9, XP002681890, Jan. 1, 2004.

Tao Xu et al., Saliency model based head pose estimation by sparse optical flow, Pattern Recognition (ACPR), IEEE, pp. 575-579, XP032130098, Nov. 28, 2011.

Rutger Rienks et al., "Differences in Head Orientation Behavior for Speakers and Listeners: An Experiment in a Virtual Environment," ACM Transactions on Applied Perception, vol. 7, No. 1, Article 2, pp. 2-2:13, XP002696420, Jan. 2010.

Rainer Stiefelhagen, "Tracking Focus of Attention in Meetings," Proceedings of the Fourth IEEE International Conference on Multimodal Interfaces (ICMI'02), pp. 273-280, XP010624328, Oct. 14, 2002.

Erik Murphy-Chutorian et al., "Head Pose Estimation in Computer Vision: A Survey," IEEE Transactions on Pattern Analysis and Machine Intelligence, vol. 31, No. 4, pp. 607-626, XP011266518, Apr. 2, 1009.

International Search Report for PCT/EP2013/054331 dated May 17, 2013.

* cited by examiner

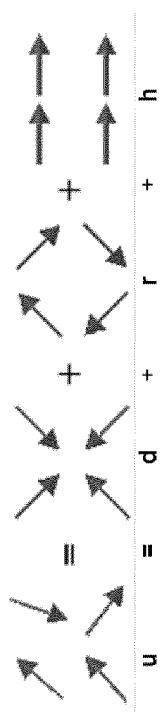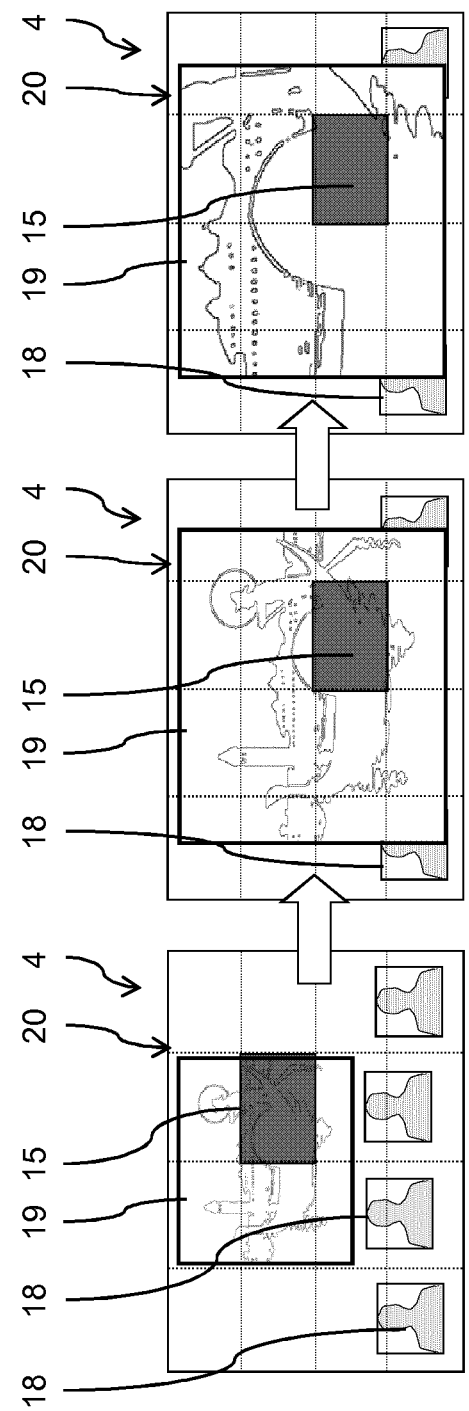

METHOD FOR CONTROL OF A VIDEO INTERFACE, METHOD FOR OPERATION OF A VIDEO INTERFACE, FACE ORIENTATION DETECTOR, AND VIDEO CONFERENCING SERVER

The present invention relates to a method for control of a video interface associated to a user for use in conference situations and the like. The present invention also relates to a method for operation of a video interface associated to a user for use in conference situations and the like. The present invention further relates to a face orientation detector comprising a video input for receiving a video stream, and a signaling output adapted to provide a control signal indicating an orientation of a face within the video stream, whereby the face orientation detector is adapted to perform the above method. The present invention also relates to a video conferencing server for providing a user interface to a user, whereby the video conferencing server is adapted to perform the method There is an increasing need for communication of persons, who are locally separated from each other. In order to facilitate communication and the exchange of information, video conferencing is becoming more and more important to allow users to talk to each other, to watch each other and/or to exchange any kind of information. In order to improve conferencing results, it is desired that users can discuss any matter in a conference-like situation where they can interact with each other in a natural way.

Video conferences are usually based on an IP connection between different users, which is used to transfer information from one participant to another. This information usually comprises an audio/video stream, which enables to watch and listen to a user, and additionally any kind of digital documents to be shared amongst the conference participants. Accordingly, each user of the video conference has a video camera for locally generating the audio/video stream of the user, which is provided to the other users, and uses a video interface, which is locally displayed on an interface device for reproduction of the audio/video streams of the users and any kind of data as used in the conference.

A video conferencing server is provided to distribute the information between all users of the video conference. Accordingly, the video conferencing server provides the video interface to the users, who can use any kind of interface device for participating in the video conference, e.g. a combination of a screen and a loudspeaker for reproducing audio/video information. The information can be provided e.g. in the form of individual streams for the audio/video streams of the users, or as a single stream comprising the individual stream, and additional documents as applicable.

In such conference situations and the like, interaction of a user with the video interface is used to improve the representation of the received information. One possibility relies on interaction of an input device, which is connected to the video interface device, e.g. a mouse. The mouse can be used as a human-machine interface as known from personal computers to highlight and manipulate parts of the video interface, where the user is concentrating on, or to configure the video conference itself. For an immersive conference this is unsatisfactory, since it breaks the feeling of natural interaction. It requires the user to concentrate momentarily on the operation of the interaction device in order to achieve the desired interaction and shifts the focus of the user away from an actual conference flow of the conference-like situation. The video conferencing server receives control inputs from the users and updates their respective video interface accordingly.

Another approach for interaction in a conference situation is based on a gaze control. Gaze control refers to monitoring the position of human eyes in order to determine an area of the screen where the user focuses on. Gaze control relies on monitoring of the eyes of the user, which has several drawbacks which impede general use of this control for immersive video conferencing and the like situations. First, gaze control requires high resolution cameras and is therefore not suitable for many common cameras as used today, e.g. common laptops or smartphones come along with video cameras, which do not provide a sufficient resolution for gaze control. Furthermore, a video stream of the video camera is usually encoded for transmission over the IP connection. Especially in low bandwidth or high latency connections, the quality of the video stream can be reduced, which has a negative impact on the accuracy and performance of gaze control. Also the use of eyewear such as glasses or sun glasses can impede the use of gaze control. Since gaze control requires high quality video information, it also requires high computational power for processing this information. Accordingly, gaze control can only be performed with particular hardware providing the required computational power.

It is therefore an object of the present invention to provide a method for control of a video interface and a method for operation of a video interface, a face orientation detector, and a video conferencing server, which overcome the above disadvantages and limitations.

This object is achieved by the independent claims. Advantageous embodiments are given in the dependent claims.

In particular is provided a method for control of a video interface associated to a user for use in conference situations and the like, comprising the steps of capturing a frame of a video stream originated from the user, recognizing a face of the user within the video frame, detecting an orientation of the face of the user within the video frame, and providing a control signal indicating the orientation of the face.

Further provided is a method for operation of a video interface associated to a user for use in conference situations and the like, comprising the steps of performing the method for control of a video interface as described above, mapping the orientation of the face based on the control signal to a focus area of the video interface, and highlighting the focus area.

Also provided is a face orientation detector comprising a video input for receiving a video stream, and a signaling output adapted to provide a control signal indicating an orientation of a face within the video stream, whereby the face orientation detector is adapted to perform the above method.

Furthermore is provided a video conferencing server for providing a user interface to a user, whereby the video conferencing server is adapted to perform the above method.

Basic idea is to detect the orientation of a face for controlling and operating a video interface. The detection of the orientation of the face can be performed without the necessity for powerful hardware requirements, e.g. for generating a video stream with a particular resolution or for providing a particular computational power. The detection of the orientation of the face can be done based on low resolution cameras, which are part of most laptops, smartphones, or other data processing devices. It can be applied even when the video stream provided to the face detector is encoded. In conference situations and the like, a person is supposed to be located in front of a camera, so that even data low quality video streams show sufficient details for the detection of the orientation of the face. The use of eyewear or other face wear only partially covers the face, which enables the detection of the orientation of the face based on parts of the face which are not covered by the eyewear or other face wear. The method is suitable for use within the cloud or by a server located in the Internet, since the video stream can be provided with a low data rate for performing the detection of the orientation of the face. No high bandwidth requirements for the transmission of the video stream exist.

The face orientation detector is a device, which can be connected provided locally at the user side, e.g. integrally with a video camera for directly passing the video stream to the face orientation detector. Accordingly, the video camera can provide the control signal indicating the orientation of the face together with its video stream. Furthermore, the face orientation detector can be located distant from the user, e.g. as a network device which is located in the Internet. The face orientation detector can be implemented as a cloud service.

The face orientation detector requires a video input for receiving the video stream, which can be any kind of suitable input. The video stream can be provided as an analog or digital video stream, e.g. via a known analog video connector directly from the video camera, or via an IP-connection as a digital video stream from the video camera.

The video conferencing server generates a video interface as described above. The operation of the video interface is controlled by the orientation of the face of the user. The user is usually located in front of a display showing the video interface, which can be for example a video screen or a projection of the video screen. The video camera is usually located at the video interface and faces the user, so that the local video stream of the user can be provided to the video conference server. With this assumption, the control signal can for example indicate the orientation of the face merely as a kind of vector, or as a position, for example in a predefined coordinate system. The control signal indicating the orientation of the face is used by the video conference server to provide a mapping of the orientation of the face to an area of the video interface, which is referred to as focus area.

The focus area is considered to be the area of highest interest for the user, and is accordingly highlighted to facilitate reception of information displayed in this area. The focus area can be represented merely by a point of the display, or by an area of the display having any form. For example, the focus area can be a circular area having a certain diameter, or a quadratic or rectangular area. The focus area can also be defined by means of items of the video conference shown on the video interface. Such items are for example representations of the video streams of users of the video conference, or reproductions of any kind of information provided by the users of the video conference, including the local user. In this case, the orientation of the face is mapped to the item which best matches the orientation of the face.

The face detection can for example be performed using a HAAR classifier, which is applied on the video frames of the video stream. The HAAR classifier labels the detection of multiple faces within the video frame and provides boundary boxes as identification of the faces. Preferably, the boundary box having the biggest size is selected as face of the user for further processing. Accordingly, even when multiple persons are together with the user visible in the video stream, the orientation of the face of the user can reliably be detected. The identification of the face features preferably uses an edge operator, e.g. Sobel or Canny and applies a SIFT feature detector or the "good features to track" algorithm.

A preferred embodiment comprises the additional step of performing skin recognition for verifying the identification of the at least one face within the video frame. Preferably, color-based skin segmentation is applied to the frame for performing a plausibility check of faces recognized e.g. by the HAAR classifier. Since the occurrence of a recognized face must match the skin color spectrum, false occurrences of faces can be rejected.

According to a preferred embodiment, the step of detecting an orientation of the face of the user within the video frame comprises the steps of identifying at least one face feature of the recognized face within the video frame, comparing a current position of the at least one face feature within the video frame with its position in a previous video frame, deriving a face orientation from the comparison of the at least one face feature within the video frame with its position in a previous video frame. Face features refer to parts of the face, which are easily be tracked, for example a nose tip, a chin, the corners of the mouse or others. The number and kind of face features to be used for the method can be chosen freely depending on e.g. video stream quality or available processing power. In principle, the method already works with a single face feature. Nevertheless, a higher number of face features increases reliability and accuracy of the detection of the orientation of the face. In order to detect the orientation of the face, the position of these face features is tracked between the different video frames. The video frames can be consecutive video frames, or video frames taken with a delay. The less video frames are processed, the lower is the computational effort, whereas the processing of consecutive video frames increases the reliability of the detection of the orientation of the face. Based on differences of the positions of the different face features, the face orientation can be derived. When multiple face features are evaluated, the face orientation can be provided as a mean value of the change of orientation of the different face features.

A preferred embodiment comprises the additional step of initializing the face orientation of the recognized face. The initialization can be performed at the beginning of the video conference, or at any time during the conference. Furthermore, the initialization can also be performed when a detection of the face is lost during the video conference. The initialization enables a reliable detection of the face of the user and sets the orientation of the face of the user to a predefined value, e.g. a NULL-value indication an orientation of the face to a center region.

According to a preferred embodiment the step of comparing a current position of the at least one face feature within the video frame with its position in a previous video frame comprises application of an optical flow estimation method. Preferably, the optical flow estimation method is the pyramidal Lukas-Kanade optical flow estimation method. This method is easily portable to different platforms and is further suitable for GPU-based execution, so that the method performs well in cloud based implementations.

According to a preferred embodiment the step of deriving a face orientation from the comparison of the at least one face feature within the video frame with its position in a previous video frame comprises calculating an orientation vector based on at least one vector field containing one vector for each face feature. The vector field preferably contains a rotational component representing a rotation of the face, a divergent component, representing movements of the face towards the camera or away, and a radiant component, representing translational movements parallel to plane of the video camera. Preferably, the three components are obtained by a Helmholtz-Hodge decomposition of the optical flow set of the face features. Further preferred, a Kalman filter is employed to reduce noise effects.

According to a preferred embodiment the step of mapping the orientation of the face to the focus area comprises providing a virtual grid in accordance with the video interface, and mapping at least one mesh of the virtual grid to the focus area. The virtual grid can be provided and used for calculation even without knowledge about the display used by the user for reproducing the video interface. The highlighting of the focus area preferably comprises highlighting at least one mesh of the grid. Accordingly, the control signal can indicate the orientation of the face by identifying one mesh. The meshes of the virtual grid can be designed in accordance with the items of the video conference.

In a preferred embodiment the step of highlighting the focus area comprises performing an up-scaling operation of the focus area. Up-scaling or zoom-in can be performed on the focus area itself, or on the focus area and a surrounding area. Preferably, the up-scaling operation is performed in respect to entire items of the video conference as shown on the video interface.

According to a preferred embodiment the step of highlighting the focus area comprises performing a down-scaling operation of an area excluding the focus area. In accordance with the up-scaling operation, the down-scaling operation can be performed around the focus area itself or the focus area and a surrounding area. Preferably, also the down-scaling is based on items shown on the video interface. The down-scaling can be performed locally, e.g. in a border area around the focus area, or on the entire remaining area of the video interface except the focus area. Preferably, up-scaling and down-scaling are combined for efficient highlighting of the focus area.

In a preferred embodiment the step of highlighting the focus area comprises showing a content of the focus area in a highlight area of the video interface. In accordance with the up-scaling, the focus area itself or the focus area and a surrounding area can be shown in the highlight area. The highlight area allows operation of the video interface without modifying major parts thereof. For example, at least one part of the video interface, e.g. a border area or a frame of the video interface, can show all items of the video conference, and another part of the video interface, e.g. a center area thereof, shows the item corresponding to the focus area. In an alternative embodiment the content of the focus area is moved to the highlight area.

According to a preferred embodiment the video conferencing server additionally comprises the above face orientation detector.

Figure 2:
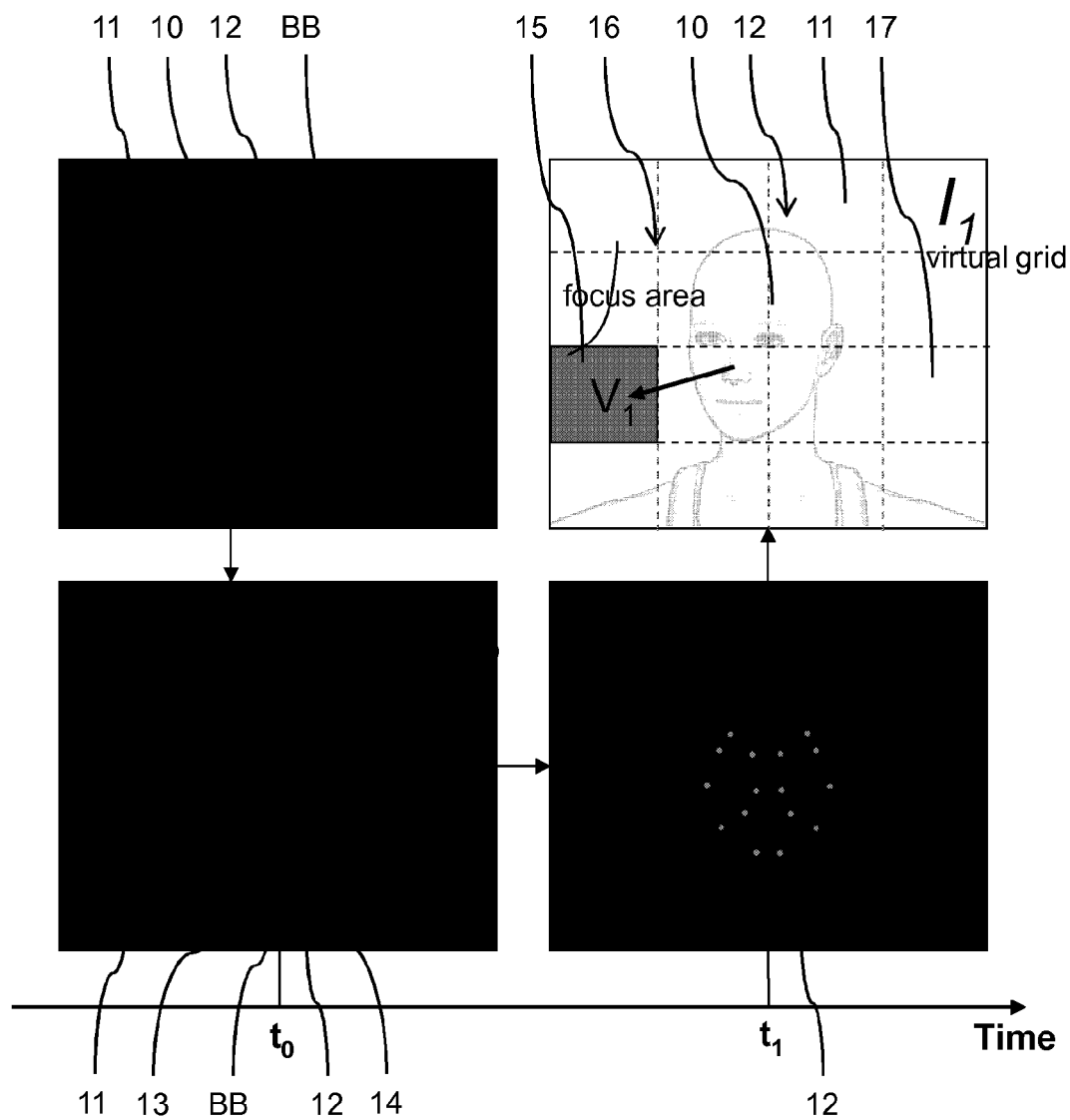
Figure 3:
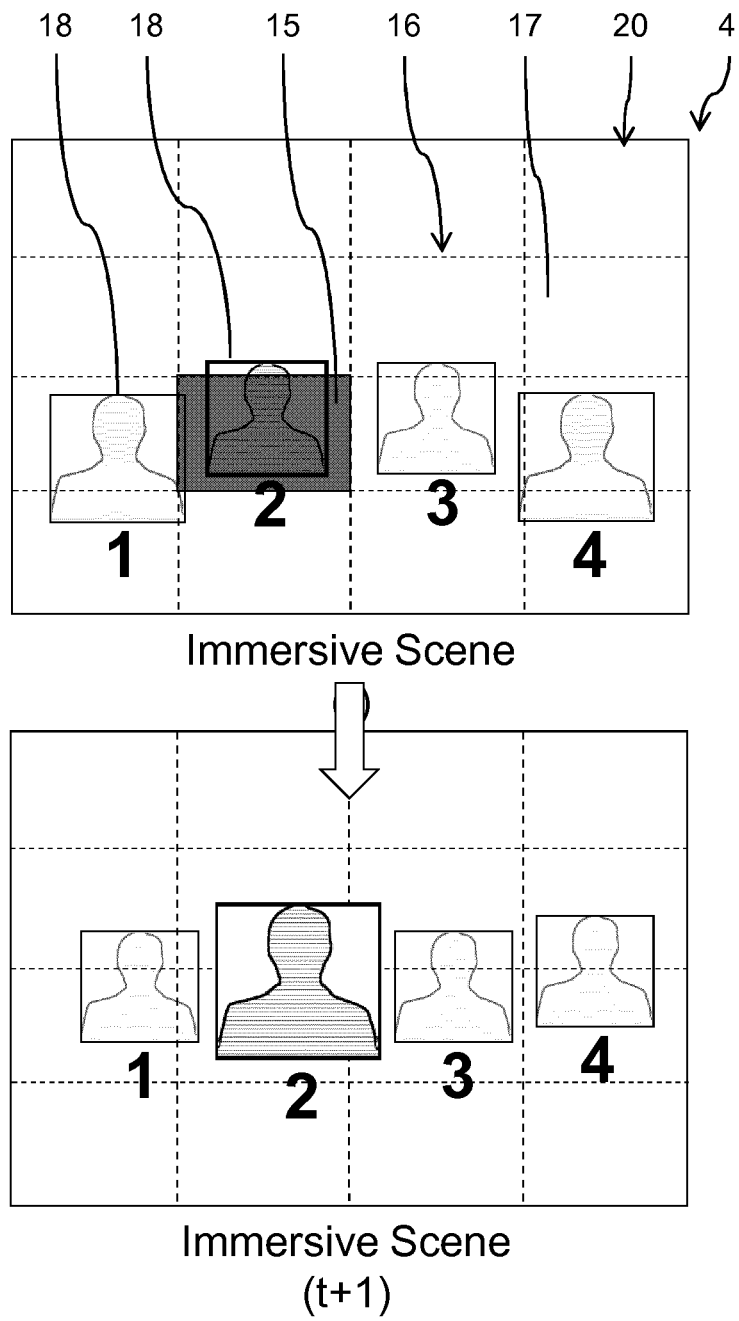
Figure 6:
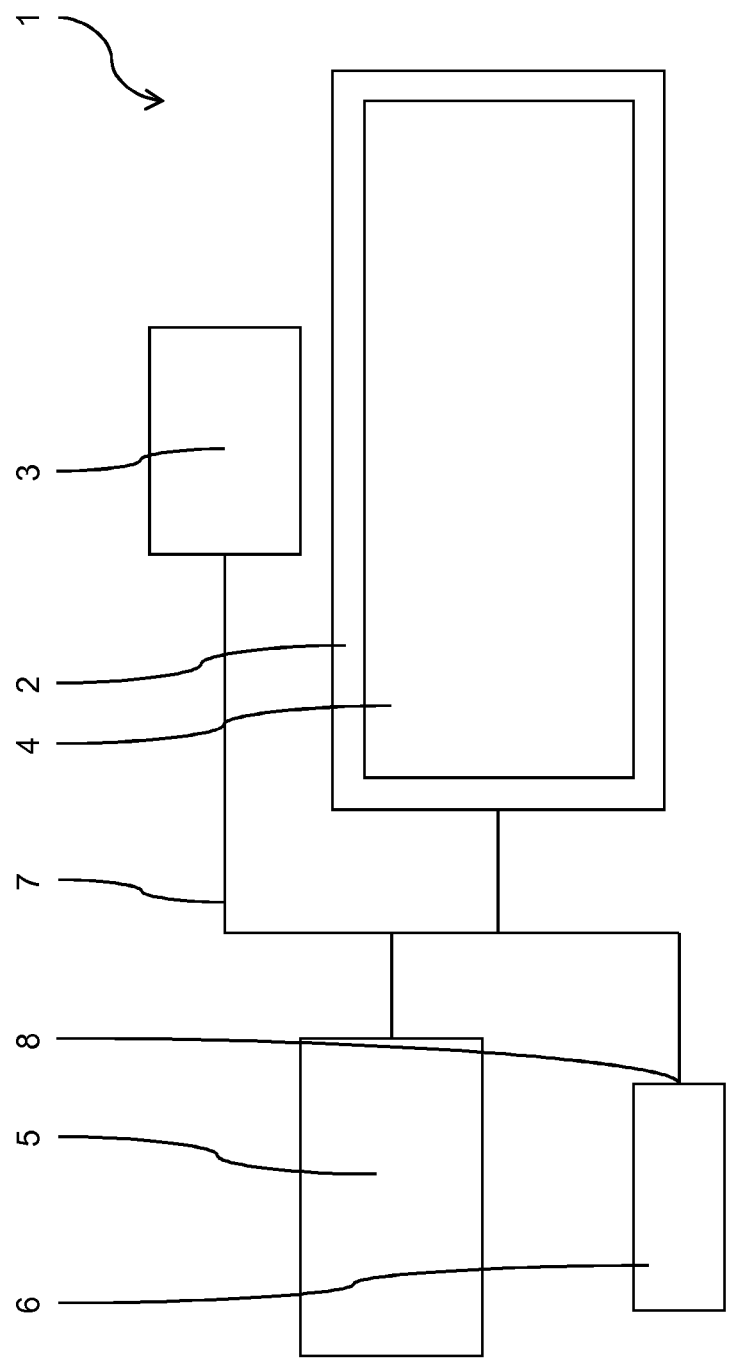

Some embodiments of apparatus and/or methods in accordance with the present invention are now described, by way of example only, and with reference to the accompanying drawings, in which:

FIG. 1 shows a flow diagram of a method for control and operation of a video interface according to an embodiment, FIG. 2 is a diagram illustrating the detection of the orientation of a face in accordance with the above method, FIG. 3 is a diagram illustrating the highlighting of an item of the video interface corresponding to a focus area in accordance with the above method, FIG. 4 is a diagram illustrating the deriving the orientation of the face based on vector fields in accordance with the above method, FIG. 5 is a further diagram illustrating the highlighting of an item of the video interface corresponding to a focus area in accordance with the above method, and FIG. 6 shows a schematical view of a video conference system comprising a video camera, a video conference server and a face orientation detector according to the first embodiment.

FIG. 6 shows a schematical view of a video conferencing system 1 according to a first embodiment. The video conferencing system 1 comprises a in this embodiment a video interface device 2, and a digital video camera 3. The video interface device 2, which is in this embodiment a LCD-display, reproduces a video interface 4 provided from a video conference server 5. The video conferencing system 1 further comprises a face orientation detector 6. The video interface device 2, the digital video camera 3, the video conference server 5, and the face orientation detector 6 are connected via an IP-connection 7. In an alternative embodiment, the face orientation detector 6 is provided integrally with the video conference server 5.

The face orientation detector 6 receives via IP-connector 8 a video stream from the digital video camera 3. The face orientation detector 6 detects the orientation of a face 10, as described in details below, and provides via the IP-connector 8 a control signal indicating the orientation of the face to the video conference server 5. Accordingly, the IP-connector 8 of the face detector 6 serves as video input for receiving a digital video stream from the digital video camera 3 and as signaling output for providing a control signal indicating an orientation of a face 10 shown in the video frame.

The video conference server 5 generates the video interface 4, i.e. a reproduction of the video conference within a conference stream, and provides it via the IP-connection 7 to the video interface device 2, where the reproduction of the video interface 4 is shown.

FIG. 1 shows a flow diagram of the method according to an embodiment. The method starts with step S100. Step S100 comprises an initialization of the method, comprising initializing face recognition and orientation of a face 10 shown in the video stream, as explained below in detail.

In the initialization step S100, a frontal face HAAR classifier, as for example provided with the Intel's OpenCV library, is applied on video frames 11 of the digital video camera 3. Individual video frames 11 corresponding to times $t_0$ and $t_1$ are illustrated in FIG. 2. The video frames 11 show a local user 12 of a video conference as provided by the digital video camera 3 in a conference situation positioned in front of the digital video camera 3 and facing towards the video interface 2 at the video interface device 2. The initialization comprises a detection of the face 10 of the user 12 and an initial location of the face 10. Face detection is implemented using a frontal-face HAAR classifier. The way a regular frontal-face HAAR classifier is trained requires that the face 10 of the user 12 must be oriented straight at the digital video camera 3 in order for detection to occur.

For each video frame 11, the HAAR classifier provides a list of face occurrences as a set of bounding boxes $BB_i$, i=1 ... n, where n represents the number of detected face occurrences. Each $BB_i$ is represented as a quadruple <X, Y, W, H> where <X, Y> represent the coordinates of the BB center in the frame and <W, H> represent its dimensions in image pixels (width, height). FIG. 2 shows a bounding box BB indicating the face 10 of the user 12 within the video frame 11.

Additionally, color-based skin recognition and segmentation is applied to the video frame 11 and skin patches are determined through connected-component analysis. The maximal bounding box $BB_{max}$ is then selected according to the following formula:

$$BB_{max} = \arg\max_{BB}\{A(BB_i) | SR_i > T_{SR}\}, i=1 \ldots n \quad (1)$$

where:
$SR_i$=skin ratio=number of pixels labeled as skin/total number of pixels in the box region;
$A(BB_i) = BB_i \cdot W \times BB_i \cdot H$ = the bounding-box area functional;
$T_{SR}$=an application-specific skin ratio threshold (e.g. 0.8);
arg max=the argument maximizing the function.

This ensures that if multiple persons are in the scene facing the digital video camera 3, only the person closest to the digital video camera 3 will be selected for further processing. False occurrences due to false positives recognitions from the Haar classifier are rejected since the occurrence must match the skin color spectrum. Accordingly, skin recognition provides a verification of the identification of the at least one face 10 within the video frame 11.

If a $BB_{max}$ is found in the video frame 11, a face orientation vector $V_0$ is initialized as follows:

origin=<$BB_{max}$·X, $BB_{max}$·Y>;
orientation=perpendicular to the frame plane;
magnitude=$BB_{max}$·H/frame height in pixels;

In step S110 the method continues with a detection of the largest face 10 in the video frame 11 as described above in respect to the initialization.

In step S120, tracking of face features 14 is performed. Accordingly, the video frame 11 where the initial face detection occurred, also denoted $I_0$ in FIG. 2, is passed through an edge operator (e.g. Sobel or Canny) to provide an edge image $E_0$ of the video frame 11 where the initial face detection occurred, also referred to a $I_0$. The edge image $E_0$ comprises a set of edges 13. At any time t after the initial face detection, a current video frame 11 is referred to as $I_t$, with $E_t$ being its corresponding edge image.

A feature set $F_0$ of face features 14 that can be tracked is obtained by applying a SIFT feature detector or an algorithm referred to as "good features to track" algorithm of Shi and Tomasi to $E_0$ within a region of interest (ROI) defined by $BB_{max}$, as illustrated in FIG. 2.

The feature set $F_0$ is then tracked in the next edge image $E_1$, by using an optical flow algorithm, e.g. the pyramidal Lukas-Kanade flow estimation method. Generally, the feature set $F_t$ in respect to edge image $E_t$ is generated by estimating the positions of each face feature 14 from the set $F_{t-1}$ by using the optical flow algorithm.

The feature set $F_t$ is represented mathematically as:

$$F_t = \{f_i | i=1 \ldots n_t\} \quad (2)$$

with each tracked face feature 14, also referred to as $f_i$, represented as a quadruple <x, y, x', y'>, where <x, y> represents the previous position of the face feature 14 in the set $F_{t-1}$ and <x', y'> the newly estimated position. Considering $\Delta x = x'-x$ and $\Delta y = y'-y$, it is immediately obvious that the face feature 14 can be represented in the form of a vector $V^f_i$ with:

origin=<x, y>
orientation=arctg($\Delta y/\Delta x$)
velocity=sqrt($(\Delta x)^2 + (\Delta y)^2$)

The algorithm must ensure that the face features 14 tracked after a certain number of video frames 11 still belong to the face 10 of the user 12. This is achieved by removing the outliers, which are wrongly estimated features, caused by noise or accumulated errors, and by regenerating the feature set $F_t$ periodically, to avoid a decrease in feature set $F_t$ cardinality after removing the outliers.

The outliers are removed by constraining the feature set $F_t$ with respect to frame difference $\Delta I_t = I_t - I_{t-1}$. The face features 14 in the feature set $F_t$ are filtered so that $$F_t = \{f_i | \Delta I_t(f_i \cdot x'; f_i \cdot y') \neq 0\} \quad (3)$$

The feature set $F_t$ is regenerated periodically (after a number of $N_f$ frames) according to the following algorithm:

for the feature set $F_t$, where t is a multiple of $N_f$, the convex polygon $C(F_t)$ is computed;
$C(F_t)$ is set as the ROI for the edge image $E_t$;
the set $F_t'$ of face features 14 that can be tracked is recomputed for $E_t$ within the previously considered ROI;
at t+1, tracking is computed starting from $F_t'$.

Due to the portability of the pyramidal Lukas-Kanade flow estimation method for GPU-based execution, this method performs very fast and is suitable for server-side implementations.

In step S130 is verified, if the set $F_t$ of tracked face features 14 is lost due to the face 10 of the user 12 moving out of a coverage area of the digital video camera 3. In case the set $F_t$ of tracked face features 14 is lost, the method returns to the step S110 for detecting the largest face 10. Otherwise, the method continues with step S140.

In step S140 the face orientation vector $V_t$ is updated in accordance with the video frame 11 currently analyzed.

An output of the optical flow algorithm is modeled as a vector field u in a domain $\Omega$ (Lipschitz-continuous almost everywhere), with the set of trackable features $F_t$ analogous to the vector field u according to $$u = \{\overline{V}^f_i | f_i \epsilon F_t\}$$

In the present scenario, the domain $\Omega$ is given by an interest region defined by the bounding box BB, where the optical flow is calculated. Every vector field u can be decomposed (under a certain set of circumstances which are met in this case) into 3 vector fields as follows, which is also shown in FIG. 4:

$$u = d + r + h$$

where:
d=the curl-free component (i.e. is an irrotational field),
r=the divergence-free (pure rotational) field, and
h=the harmonic field (i.e. is a gradient).

A Helmholtz-Hodge decomposition of the optical flow set $F_t$ of tracked face features 14 given by equation (3) is performed. The Helmholtz-Hodge decomposition yields three components:

a rotational component, representing the rotations of the face 10;
a divergent component, representing movements of the face 10 towards the digital video camera 3 or away from it, and
a gradient component, representing pure translational movements parallel to the camera plane.

The Helmholtz-Hodge decomposition is executed using a meshless algorithm inspired from fluid dynamics that consists in solving a linear system.

The rotational, divergence and harmonic components of the vector field $F_t$ are then projected as rotations around the head-centered reference framework. These rotations are namely:

roll: rotation around x-axis,
pitch, rotation around y-axis,
yaw, rotation around z-axis and are represented as a $\{\Delta p, \Delta q, \Delta r\}$ triplet storing angular differences from the previously known face orientation $V_{t-1}$. Updating $V_{t-1}$ with these values gives the current head attitude, also represented in angular form as a $\{p, q, r\}$ triplet.

Using these three rotation components directly as an indicator of head attitude (i.e. the point where the face 10 of the user 12 is focusing on) can be improved to reduce the impact of noise. The noise stems from the inaccuracy of pixel-based representations and from non-linearities of the video camera 3.

To remove the noise effect, a Kalman filter is employed. A Kalman filter directly tracking the head attitude vector would involve singularities (due to the angular representation of the $\{p, q, r\}$ triplet), so the formulation happens in terms of a quaternion. The quaternion is a vector in $R^4 = \{q_1, q_2, q_3, q_4\}$ representing a rotation around the head-centered reference framework. Conversions between quaternions and classical $R^3$ vectors are straightforward and known to a person skilled in the art.

The Kalman notation can be taken and adapted from flight dynamics by applying the simplifying assumption that the absolute position of the head is not of interest, but only on its attitude vector. Thus, internal states of the discrete Kalman filter are modeled simply by the quaternion orientation. Matrixes [A], [B] are taken and adapted from mechanics of the rigid body, and error matrices [Q], [P] and [R] (process-, estimation- and measurement-error covariance or noise) are defined as being $[Q]=\sigma I_{4\times 4}$, [P] is only needed for $t=0$ and is selected to be a matrix of large values in the diagonal (e.g. $10^5$) stating mathematically that the measurements are very important in the early times of the tracker, as opposed to e.g. to state tracking.

Matrix [R] is $$R_k = \begin{bmatrix} \sigma_\phi^2 & 0 & 0 \\ 0 & \sigma_\theta^2 & 0 \\ 0 & 0 & \sigma_\varphi^2 \end{bmatrix}_k$$

where the σ are determined experimentally.

In the final part of this step, the result obtained from the Kalman filter gives the orientation of the $V_t$ vector in 3D space, while the ratio between the bounding box BB of the face 10 and the size of the video frame 11 gives its magnitude $|V_t|$. The vector $V_t$ obtained this way is an indication for the orientation of the face 10 of the user 12, which can be provided from the face detector 6 by means of a control signal to the video conference server 5.

In step S150 a focus area 15 of the display 4 is determined. The focus area 15 corresponds to a location on the video interface 4 where the user 12 is focusing. Accordingly, the face-centered orientation vector $V_t$ is projected onto a virtual grid 16 of N×M cells 17, also referred to as meshes. The virtual grid 16 is overlaid on top of the video frame 11 as shown in FIG. 2. Computing the projection is straightforward, by taking in consideration only the X and Y-axis components of the vector, $V^X_t$ and $V^Y_t$.

The mesh 17 pointed to by $V_t$'s projection on the XY plane represents the focus area 15 on the video interface 4. Furthermore, $A^f_i$ is used to determine an item 18, 19 in an immersive communications interactive scene 20 shown on the video interface 4, as shown in FIGS. 3 and 5 and further explained below.

In an immersive video conference, each user 12 or participant $P_i$ is presented with its interactive scene 20, also denoted $S_i$, which can be customized. The interactive scene 20 shows the items 18, 19 comprising video stream screens 18 of the other users 12, shared documents 19, also referred to as $\{P_j, j=1 \ldots n, j<>i\}$, and its own video stream screen 18. Each video stream is subject to a cutout algorithm that separates the silhouette of the user 12 from the background and renders it in the video stream. The purpose of this layout is to give each user 12 the impression of being in the same room and facing the other attendees. All the processing is performed on the video conference server 5 in the cloud. A processing pipeline (PPL) maintains a record with the position of each user 12, $P_j$ in each interactive scene 20, $S_i$, represented as a bounding-box $BB_j$.

By monitoring face orientation of each user 12, $P_i$ through the algorithm described above, the PPL computes the focus area 15, $A^f_i$ and overlays it on top of the interactive scene 20, $S_i$, as shown in FIG. 3. The user 12 must direct its face for a certain time interval T in the direction of the focus area 15 in order to be registered as change of the orientation of the face 10. Once the orientation of the face 10 is registered, the PPL checks for the maximal intersection with the bounding boxes of the items 18, 19 in the interactive scene 20.

$$BB_f = \arg\max_{BB}\{\cap(BB_j) = A^f_i \cap BB_j | j \neq i\}$$

The focused item 18, 19, that is represented by $BB_f$, is then highlighted in step S170. Accordingly, if the focused item 18, 19 is a video stream screen 18, the video stream screen 18 is scaled upwards proportional to the magnitude of the face orientation vector $|V^i|$ of the respective user 12, $P_i$. This scaling may be accompanied by reducing the scale of the other users 12 and rearranging them in the scene 20, $S_i$ through a smooth and short transitional animation, as illustrated in FIG. 3. As the PPL monitors $|V^i|$ constantly, the scale of the focused video stream screen 18 can be adjusted as the local user 12 in front of the camera ($P_j$) moves closer or further away from the video interface device 2. If the focused item 18, 19 is a document 19, its position in the interactive scene 20 is scaled proportional to $|V^i|$ until the document 19 occupies the whole interactive scene 20, as indicated in FIG. 5. If $|V^i|$ still increases after the document 19 has been scaled to the full scene size (Pi moves very close to the video interface device 2), and $|V^i| > T_{zoom}$ (where $T_{zoom}$ is an application-specific threshold) a zoom on the document 19 contents is performed as further illustrated in FIG. 5.

After highlighting the item 18, 19 according to the focus area 15, the method returns to step 120.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope

The invention claimed is:

1. A method for control of a video interface associated to a user for use in conference situations and the like, comprising:
   capturing a frame of a video stream originated from the user;
   recognizing a face of the user within the video frame;
   detecting an orientation of the face of the user within the video frame;
   providing a control signal indicating the orientation of the face; and
   mapping the orientation of the face based on the control signal to a focus area of the video interface.

2. The method according to claim 1, comprising performing skin recognition for verifying the identification of the at least one face within the video frame.

3. The method according to claim 1, whereby detecting an orientation of the face of the user within the video frame comprises
   identifying at least one face feature of the recognized face within the video frame,
   comparing a current position of the at least one face feature within the video frame with its position in a previous video frame,
   deriving a face orientation from the comparison of the at least one face feature within the video frame with its position in a previous video frame.

4. The method according to claim 3, comprising initializing the face orientation of the recognized face.

5. The method according to claim 3, whereby comparing a current position of the at least one face feature within the video frame with its position in a previous video frame comprises application of an optical flow estimation method.

6. The method according to claim 3, whereby deriving a face orientation from the comparison of the at least one face feature within the video frame with its position in a previous video frame comprises calculating an orientation vector based on at least one vector field containing one vector for each face feature.

7. The method according to claim 1, further comprising: highlighting the focus area.

8. The method according to claim 1, whereby mapping the orientation of the face to the focus area comprises
providing a virtual grid in accordance with the video interface, and
mapping at least one mesh of the virtual grid to the focus area.

9. The method according to claim 7, whereby highlighting the focus area comprises performing an up-scaling operation of the focus area.

10. The method according to claim 7, whereby highlighting the focus area comprises performing a down-scaling operation of an area excluding the focus area.

11. The method according to claim 7, whereby highlighting the focus area comprises showing a content of the focus area in a highlight area of the video interface.

12. A face orientation detector comprising
a video input for receiving a video stream, and
a signaling output adapted to provide a control signal indicating an orientation of a face within the video stream, whereby
the face orientation detector is adapted to perform the method according to claim 1.

13. A video conferencing server for providing a user interface to a user, whereby the video conferencing server is adapted to perform the method according to claim 1.

14. A video conferencing server comprising a face orientation detector according to claim 12.

* * * * *